United States Patent [19]

McGivern

[11] Patent Number: 5,483,190
[45] Date of Patent: Jan. 9, 1996

[54] FLOATING VOLTAGE CONTROLLED THERMISTOR/PLATINUM PROBE EMULATOR

[75] Inventor: Kevin G. McGivern, Lakeville, Conn.

[73] Assignee: United Technologies Corporation, Hartford, Conn.

[21] Appl. No.: 347,960

[22] Filed: Dec. 1, 1994

[51] Int. Cl.⁶ .................................................. G06F 5/00
[52] U.S. Cl. .................. 327/334; 327/513; 323/353; 324/607; 324/705; 374/1
[58] Field of Search .................................. 327/334, 187, 327/336, 77, 512, 513; 324/601, 610, 705, 707; 73/1 R; 323/352, 353; 374/1

[56] References Cited

U.S. PATENT DOCUMENTS

| | | | |
|---|---|---|---|
| 3,754,442 | 8/1973 | Arnett | 73/362 AR |
| 4,014,382 | 8/1977 | Washburn | 324/65 R |
| 4,150,573 | 4/1979 | Iinuma et al. | 73/362 AR |
| 4,275,345 | 6/1981 | Tait | 323/363 |
| 4,335,349 | 6/1982 | Baldock et al. | 324/62 |
| 4,406,766 | 9/1983 | MacDonald | 204/433 |
| 4,537,516 | 8/1985 | Epstein | 374/1 |
| 4,728,881 | 3/1988 | Evans et al. | 323/353 |
| 5,255,975 | 10/1993 | Adams | 374/601 |
| 5,352,974 | 10/1994 | Heger | 324/67 |

Primary Examiner—Timothy P. Callahan
Assistant Examiner—Kenneth B. Wells
Attorney, Agent, or Firm—Richard H. Kosakowski; Holland & Associates

[57] ABSTRACT

Electronic circuitry for simulating the resistance characteristics of a variable resistance temperature sensing element includes a multiplier that multiplies the difference between a reference voltage and a desired value of a control voltage times the voltage across a precision resistor at the output of the circuitry. The multiplier product output signal is integrated and a voltage value of the integrator output controls the gate terminal of a field effect transistor. The drain and source terminals of the transistor are connected in series with the precision resistor. The combination of the current through the precision resistor and the transistor (or the voltage across the precision resistor), together with the voltage value of the control signal, controls the voltage input value to the integrator, which, in turn, controls the resulting resistance across the output terminals of the transistor.

17 Claims, 2 Drawing Sheets

FLOATING VOLTAGE CONTROLLED THERMISTOR/PLATINUM PROBE EMULATOR

BACKGROUND OF THE INVENTION

This invention relates to an electronic circuit for simulating the resistance characteristics of a variable resistance sensing element, and more particularly to such a circuit that varies the value of an apparent resistance at its output in proportion to the value of a voltage applied at an input to the circuit.

In an actual implementation of a closed-loop system that controls a variable based on a feedback parameter such as temperature, a temperature-sensitive transducer element, such as a thermistor or a platinum probe, is utilized to generate the signal indicative of the actual value of the parameter. The resistance or impedance of the transducer varies in some known proportion across the temperature range of interest. This resistance is then used as the feedback parameter and is compared to a desired resistance value. Any difference therebetween is typically used to drive an actuator to adjust the overall system to match the actual and desired resistance values, and thus the temperature values.

For example, an aircraft environmental control system ("ECS") controls, among other things, the temperature of the air in the aircraft cabin and cockpit. The temperature at various locations in the cabin is sensed by temperature-sensitive probes, such as thermistors or platinum probes, and signals indicative of the various temperatures are provided as resistance values to a central processor. The processor runs various software routines, one of which compares the sensed temperature with a desired temperature value for each of the various portions of the cabin. If there exists any difference in the actual and desired temperature values for any region of the cabin, then the central processor commands an actuator, which moves an air inlet valve to adjust the temperature in that region of the cabin.

During the laboratory development of such an aircraft ECS, or the laboratory testing of an existing ECS, it is often required to emulate the sometimes complex resistance characteristics of the temperature sensing element on a test rig or fixture. A temperature sensing element, such as a thermistor or platinum probe, may have a positive or negative temperature coefficient. One known emulation technique is to use a variable resistance device, such as a potentiometer, to simulate the thermistor or platinum probe across its entire operating range. However, the potentiometer is a manually-adjustable device. As used in such a setup, a person must measure the desired commanded value of the temperature, usually expressed as a voltage, and then must use extreme caution to adjust the potentiometer as best as possible to match the commanded temperature value. This is an inaccurate technique in that the value of the potentiometer is determined by reading the number of turns off of the potentiometer dial and then calculating the resulting value of the potentiometer resistance therefrom. This suffers in both speed and accuracy.

Other known, but inaccurate, techniques for simulating a temperature-dependent resistance includes a resistance or impedance bridge circuit, and a switch decade resistance box. A bridge often becomes unstable over time. Also, the bridge requires a manual adjustment through use of a potentiometer, to provide a desired resistance value. On the other hand, the switch decade box is a cumbersome tool that utilizes a plurality of different resistor values. Thus, the decade box cannot provide the continuous "analog-type" resistance variance that a potentiometer can.

SUMMARY OF THE INVENTION

Accordingly, it is a primary object of the present invention to provide an electronic circuit that automatically and accurately simulates the resistance characteristics of a temperature sensor.

It is a general object of the present invention to automatically and accurately simulate a desired resistance value of a thermistor or platinum probe using a circuit with a voltage input, the value of the voltage input corresponding to the desired resistance value.

It is another object of the present invention to provide such a simulation circuit that provides for a wide range of resistance values at its output.

It is yet another object of the present invention to provide such a simulation circuit that can either have its two output terminals floating, or have one terminal tied to electrical ground.

The above and other objects and advantages of this invention will become more readily apparent when the following description is read in conjunction with the accompanying drawings.

To overcome the deficiencies of the prior art and to achieve the objects listed above, the Applicant has invented an electronic circuit that receives a varying DC voltage value as input and provides a controlled, varying resistance whose apparent value corresponds to the value of the voltage input.

In a preferred embodiment a reference DC voltage value is applied to a first input ($Y_1$) of an analog multiplier, while a control voltage representative of the desired value of the apparent resistance of the circuit output is applied to a second input ($Y_2$) of the multiplier. The multiplier has third and fourth inputs, $X_1$ and $X_2$, respectively, that connect across a fixed precision value resistor. This resistor is connected in series with a field effect transistor ("FET"), whose resistance across its drain and source terminals varies depending upon the voltage applied to the gate terminal of the FET. The total resistance across the precision resistor and the FET represents the resistance output of the circuit of the present invention.

The multiplier output is defined by the function of the product of the difference of the reference voltage minus the control voltage and the voltage across the precision resistor (i.e., $(X_1-X_2)\cdot(Y_1-Y_2)$). The voltage at the multiplier output is fed to an integrator, and the integrator output voltage is connected to the gate of the FET. In operation, as the control voltage input to the multiplier is varied, the integrator varies the voltage applied to the gate of the FET. This, in turn, varies the apparent resistance at the output of the circuit across the series electrical connection of the precision resistor and the FET.

In further accordance with the preferred embodiment of the present invention, the circuit includes a pair of amplifiers configured as voltage followers or buffer amplifiers. The voltage followers are connected in one embodiment to the two output terminals of the circuit. In the second embodiment, the voltage followers are connected across the drain and source terminals (i.e., the output terminals) of the FET. The output of each voltage follower is fed to an associated input of a differential amplifier, whose output is fed back into the input of the integrator through a resistor. The differential amplifier is arranged such that its slightly negative DC voltage output upon power-up of the circuit is provided to the integrator input to create a positive voltage on the integrator output. This, in turn, ensures that the FET is slightly turned on at power-up, and, therefore, the resistance across the FET is at a value less than its maximum value.

DETAILED DESCRIPTION OF THE PREFERRED EMBODIMENTS

Figure 1:
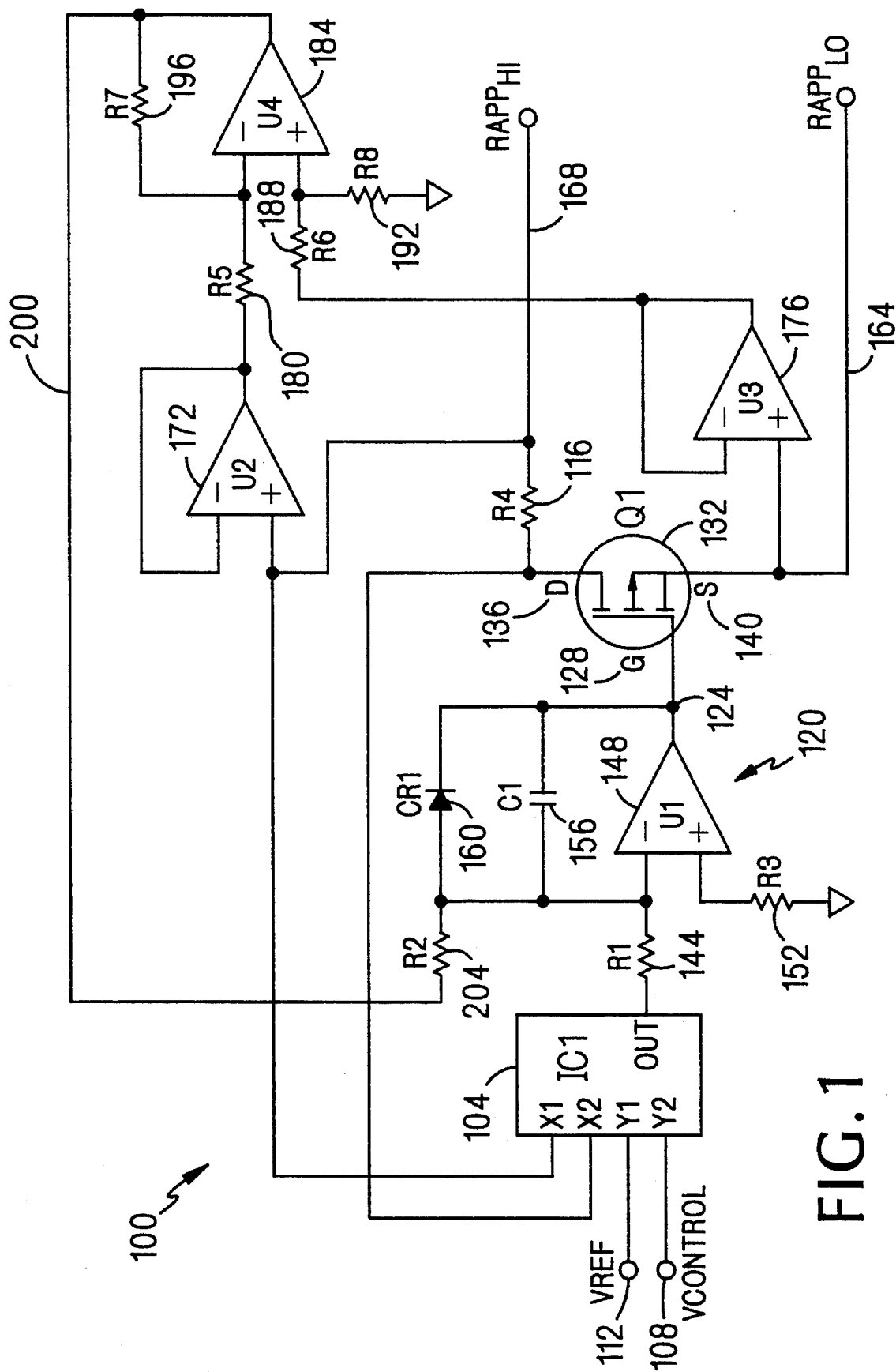
FIG. 1 is a schematic diagram illustration of electronic circuitry for providing a controlled resistance value in accordance with a preferred embodiment of the present invention.

Referring to the drawings in detail, electronic circuitry for providing a variable resistance value in proportion to a voltage value of an input signal is illustrated therein and generally designated by the reference numeral 100. An analog multiplier 104 compares the control voltage signal 108 to a reference voltage signal 112 and any difference therebetween is multiplied by the voltage across a precision resistor 116 of fixed resistance value at the circuit output. The output of the analog multiplier 104 is fed to an integrator 120 and the voltage value of a signal 124 at the integrator output drives the gate terminal 128 of a field effect transistor 132 ("FET"). The drain and source terminals 136, 140 of the FET 132 represent the output of the FET 132 and are connected in series with the precision resistor 116. The total resistance of the circuit 100 is taken to be the resistance across the output of the FET 132 and the precision resistor 116. The output resistance of the FET 132 varies in proportion to the voltage signal 124 applied to the gate terminal 128, which itself is dependent upon the voltage value of the control voltage signal 108 and the voltage across (or, the current through) the precision resistor 116.

Referring to FIG. 1, there illustrated is a preferred embodiment of the circuitry 100 of the present invention. An analog multiplier, $IC_1$ 104, is provided, which may be the Model AD632, commercially available from Analog Devices. A DC reference voltage, VREF 112, of, e.g., +10 VDC, is provided to the $Y_1$ input of the multiplier 104. A control voltage signal, VCONTROL 108, which has a voltage that varies between 0 VDC and +10 VDC, is provided to the $Y_2$ input of the multiplier 104. The control voltage signal may be provided by any suitable means, such as a microprocessor (not shown), or other circuitry. The multiplier 104 further includes a second set of inputs, $X_1$ and $X_2$, that are connected across the precision resistor, $R_4$ 116. This resistor 116 makes up part of the output resistance of the circuit 100. The multiplier 104 multiplies the difference between the reference voltage 112 and the control voltage 108 by the voltage across the precision resistor 116. In other words, the multiplier 104 operates according to the function $(X_1-X_2)\cdot(Y_1-Y_2)$.

The multiplier 104 provides its resulting product output as a signal through a resistor, $R_1$ 144, to an inverting input of an operational amplifier, $U_1$ 148, configured as an integrator 120. $R_1$ 144 may comprise a 10K ohm resistor, while the operational amplifier 148 may comprise the Model LF147D, commercially available from National Semiconductor. A resistor, $R_3$ 152, is connected between the non-inverting input of the operational amplifier 148 and ground. The resistor, $R_3$ 152, may also have a value of 10K ohms. A capacitor, $C_1$ 156, and a diode, $CR_1$ 160, are connected in parallel between the inverting input of the operational amplifier 148 and an output of the operational amplifier 148. The value of the capacitor, $C_1$ 156, may be 0.1 uF, while the diode, $CR_1$ 160, may comprise the Model 1N4148, commercially available.

The output of the integrator 120 on a signal line 124 is fed to the gate ("G") terminal 128 of the FET 132 ($Q_1$), which may comprise the Model IRFF220, commercially available from International Rectifier. The drain ("D") terminal 136 of the FET 132 is connected to one end of the precision resistor, $R_4$ 116, while the source ("S") terminal 140 of the FET 132 represents one of the output signals (i.e., the "low side" output) on the line 164, $RAPP_{LO}$, from the circuitry 100. The other side of the precision resistor, $R_4$ 116, represents the second output (i.e., the "high side" output) on the line 168, $RAPP_{HI}$, of the circuitry 100. Both output terminals 164, 168 may be left "floating" or the low side output terminal 164 may be connected to electrical ground.

In operation, the control voltage signal 108 represents a desired voltage value that is fed into the $Y_2$ input of the multiplier 104. This voltage value represents, in turn, a desired resistance value across the output terminals 136, 140 of the FET 132. The output signal from the multiplier 104 is integrated by the integrator 120, and the integrator output voltage signal 124 is fed to the gate terminal 128 of the FET 132. The output voltage of the FET 132, as measured across its drain and source terminals, 136, 140, varies depending upon its gate voltage. Further, the resistance across the drain and source terminals 136, 140 of the FET 132 (i.e., the "apparent" resistance) also varies with the voltage thereacross.

For example, with a control voltage 108 of 0 VDC applied to the multiplier 104, the output 124 of the integrator 120 will be at its largest voltage value (discounting the voltage across the precision resistor 116 fed back to the multiplier 104). This, in turn, will cause the FET 132 to be "fully on"; that is, there will be approximately 0 VDC across the drain and source terminals 136, 140 of the FET 132. Further, the resistance across the drain and source terminals 136, 140 will be approximately 0.1 ohms. It follows that the value of the controlled resistance applied across the output terminals 164, 168 of the circuitry 100 will equal the resistance value of the precision resistor, $R_4$ 116.

On the other hand, when the control voltage 108 is at its other extreme value of +10 VDC, the output 124 of the integrator 120 will be approximately 0 VDC, and the FET 132 will then be in an off state. As such, the resistance across the drain and source terminals 136, 140 of the FET 132 will be approximately 10 megaohms. This resistance adds in series to that of the precision resistor, $R_4$ 116, and represents the controlled resistance output value of the circuitry 100 of the present invention.

In between the aforementioned two extremes for the values of the control voltage 108, the FET 132 will exhibit a resistance between its drain and source terminals 136, 140 that varies in some proportion (e.g., linearly) to the value of the control voltage 108 applied to the multiplier 104. This, in turn, varies the output resistance of the FET between its extremes of 0.1 ohms and 10 megaohms. In this way, by controlling the value of the control voltage 108, the value of the controlled resistance of the circuitry 100 can be controlled to a specific desired value.

The circuitry 100 of the present invention, as illustrated in FIG. 1, also includes a pair of operational amplifiers, $U_2$ 172 and $U_3$ 176, configured as voltage followers or buffer amplifiers. Both of these operational amplifiers 172, 176 may comprise the Model LF147D, commercially available from National Semiconductor. The first output terminal, $RAPP_{HI}$ 168, of the circuitry 100 is connected to the non-inverting input of the first operational amplifier 172. The inverting input of this amplifier 172 is connected to its output. In a similar manner, the second output terminal, $RAPP_{LO}$ 164, of the circuitry 100 is connected to the non-inverting input of the second operational amplifier 176. The inverting input of this amplifier 176 is connected to its output.

The output of the first buffer amplifier 172 is connected through a resistor, $R_5$ 180, to the inverting input of an operational amplifier, $U_4$ 184, configured as a differential amplifier. The differential amplifier 184 may also comprise the Model LF147D. The output of the second buffer amplifier 176 is connected through a resistor, $R_6$ 188, to the non-inverting input of the differential amplifier 184. A resistor, $R_8$ 192, is connected between this non-inverting input of the differential amplifier 184 and ground. A resistor, $R_7$ 196, is connected between the inverting input of the differential amplifier 184 and the output of the differential amplifier 184. The value for each of the resistors, $R_5$ 180 and $R_6$ 188, may be 49.9K ohms, while the value for each of the resistors, $R_7$ 196 and $R_8$ 192, may be 1K ohms.

The output of the differential amplifier 184 on the line is fed through a resistor, $R_2$ 204, whose value may be 10K ohms, to the inverting input of the integrator operational amplifier 148. The differential amplifier 184 ensures that the integrator 120 starts up properly. That is, upon start-up or power-up of the circuitry 100 of the present invention, the current through, and thus the voltage across, both the precision resistor, $R_4$ 116, and the FET 132, is near zero. To ensure proper start-up of the integrator 120, a slightly negative DC voltage input value is required. The differential amplifier 184 provides this slightly negative voltage value. By doing so, it ensures that the integrator 120 starts off properly and that the controlled resistance at the output terminals 164, 168 of the circuitry 100 does not remain at its highest value. The differential amplifier 184 does this by taking the "high side" voltage of the signal, $RAPP_{HI}$ 168, and subtracting it from the "low side" voltage, $RAPP_{LO}$ 164. Since the "high side" voltage is slightly greater than the "low side" voltage, the output of the differential amplifier 184 on the line 200 will be a slightly negative DC voltage value. Then, by feeding this negative voltage value to the integrator input, a positive voltage swing is produced at the integrator output, to properly start up the integrator 120. This ensures that the FET 132 will be slightly turned on at start-up or power-up. Without this negative voltage supplied by the differential amplifier 184, the FET 132 will be fully turned off at start-up. This is because the current through the resistor, $R_4$ 116, and thus the voltage across $R_4$ 116 is zero. In turn, this causes the multiplier output signal and the integrator output to both also be zero. The FET 132 will then provide its extremely high impedance value across its drain and source terminals 136, 140.

Once the circuitry 100 has overcome start-up, it is anticipated that a value of control voltage 108 between 0 VDC and +10 VDC is applied to the multiplier 104. Also, a current flows through $R_4$ 116 and the FET 132. Thus, the multiplier output, the integrator output and the gate voltage are all proportional to the control voltage 108 and the current through $R_4$ 116 and the FET 132 (or the voltage across $R_4$ 116) fed to the multiplier 104.

It should be understood, however, that for the broadest scope of the present invention, the two buffer amplifiers 172, 176 and the differential amplifier 184, along with their associated circuitry, are not required.

The integrator 120 is used to smooth the output voltage signal of the multiplier 104 and the differential amplifier 184. The speed or time constant of the integrator 120 is chosen to increase the immunity of the circuitry 100 to high frequency noise. The integrator 120 also allows for the circuitry 100 to correct itself for any DC voltage errors.

Figure 2:
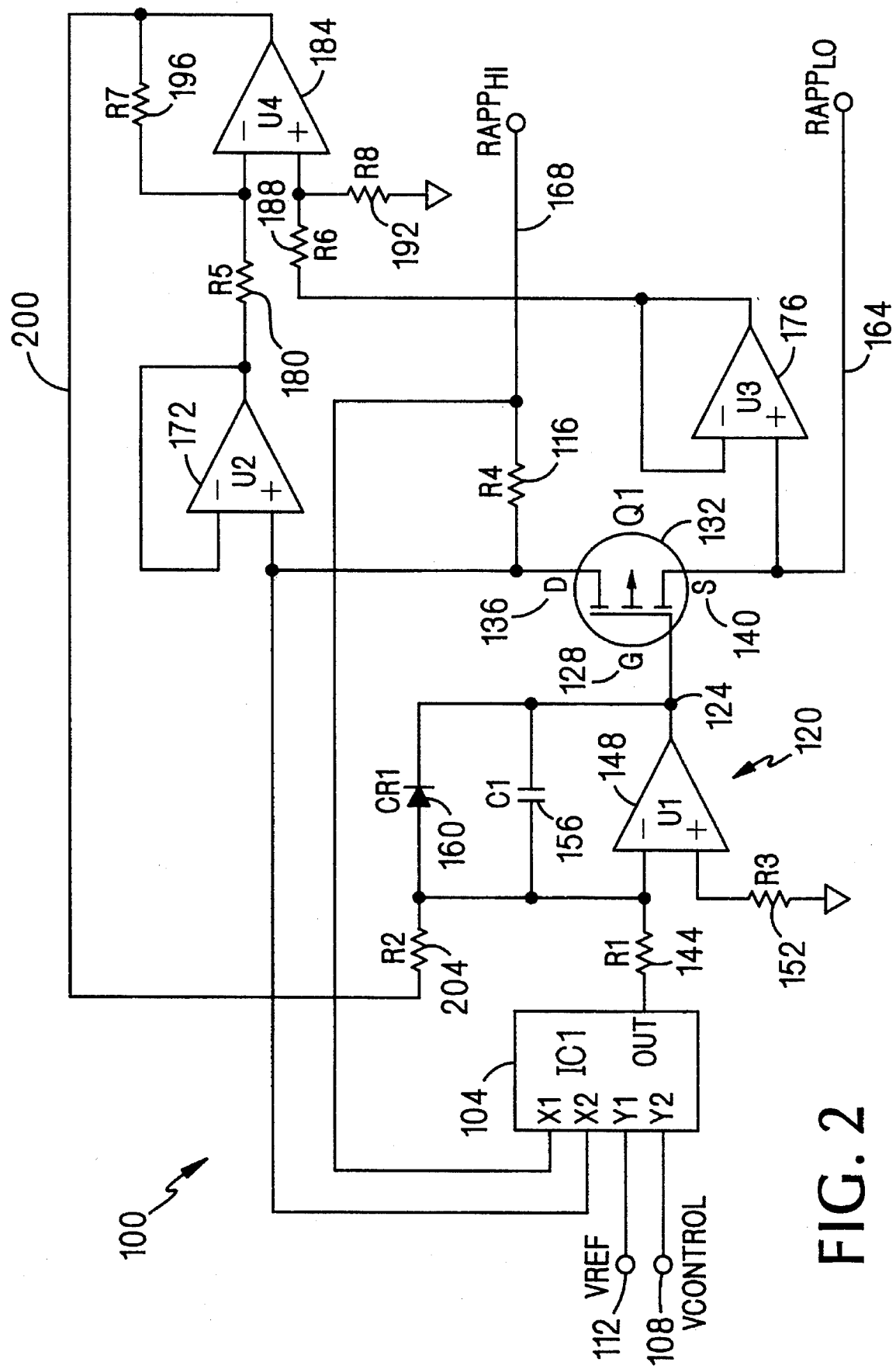
FIG. 2 is an alternative embodiment of the circuitry of FIG. 1.

Referring now to FIG. 2, the circuitry 100 therein is virtually identical to that of FIG. 1, with the exception that now the non-inverting input of the first buffer amplifier 172 is connected to the junction or node between the drain terminal 136 of the FET 132 and the lower end of the resistor, $R_4$ 116. The result is that now the differential amplifier 184 takes the difference between voltage values at the drain and source terminals 136, 140 of the FET 132, and uses this as the start-up signal to the integrator 120. Otherwise, the circuitry 100 of FIG. 2 is identical to that of FIG. 1. Thus, identical reference numbers are used in both figures.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. Apparatus for providing a controlled resistance of a predetermined value, comprising:
   a. means for providing a fixed resistance of a predetermined value;
   b. means for providing a variable resistance connected with the means for providing the fixed resistance, the value of the controlled resistance value being a function of the value of the fixed resistance and a value of the variable resistance; and
   c. means, responsive to a control signal indicative of a desired value for the controlled resistance, for controlling the value of the variable resistance depending on a value of the control signal, the control signal having a voltage value that varies depending upon a desired value for the controlled resistance, the means for controlling comprising means for multiplying any difference between the voltage value of the control signal and a reference voltage of a predetermined value by a voltage across the means for providing a fixed resistance and for providing a product signal indicative thereof, the means for controlling further comprising means for integrating the product signal and for providing an integrated product signal indicative thereof, the means for providing a variable resistance being connected to the integrated product signal for providing the value of the variable resistance in dependence thereon.

2. The apparatus of claim 1, wherein the means for providing a fixed resistance comprises a resistor having a predetermined fixed value.

3. The apparatus of claim 1, wherein the means for providing a variable resistance comprises a transistor.

4. The apparatus of claim 1, wherein the means for providing a variable resistance comprises a field effect transistor.

5. The apparatus of claim 1, wherein the function of the value of the fixed resistance and the value of the variable resistance is a sum of the value of the fixed resistance and the value of the variable resistance.

6. The apparatus of claim 1, further comprising means for sensing a value of a voltage across the controlled resistance and for providing a sensed signal indicative thereof.

7. The apparatus of claim 6, wherein the controlled resistance has a first terminal corresponding to a first terminal of the means for providing a fixed resistance and a second terminal corresponding to a first terminal of the means for providing a variable resistance, and wherein the means for sensing comprises means for comparing a voltage at the first terminal of the controlled resistance with a voltage at the second terminal of the controlled resistance, and for providing the sensed signal with a value indicative of any difference therebetween.

8. The apparatus of claim 7, wherein the sensed signal is connected with an input of the means for integrating, the means for integrating being responsive to a voltage value of the sensed signal for integrating the product signal and the sensed signal and for providing the integrated product signal.

9. The apparatus of claim 8, wherein the means for comparing comprises a differential amplifier having a pair of inputs connected with the first and second terminals of the controlled resistance.

10. The apparatus of claim 9, further comprising first buffer means having an input connected to the first terminal of the controlled resistance and having an output connected to a first one of the pair of inputs of the differential amplifier, and further comprising a second buffer amplifier having an input connected to the second terminal of the controlled resistance and having an output connected to the second one of the pair of inputs of the differential amplifier.

11. The apparatus of claim 1, further comprising means for sensing the value of a voltage across the means for providing a variable resistance and for providing a sensed signal indicative thereof, the means for sensing comprising means for comparing a voltage at a first terminal of the means for providing a variable resistance with a voltage at a second terminal of the means for providing a variable resistance, and for providing the sensed signal with a value indicative of any difference therebetween, the sensed signal being connected to an input of the means for integrating, the means for integrating being responsive to a voltage value of the sensed signal for integrating the product signal and the sensed signal and for providing the integrated product signal indicative thereof, the means for comparing comprising a differential amplifier having a pair of inputs connected with the first and second terminals of the means for providing a variable resistance, and further comprising a first buffer amplifier having an input connected to the first terminal of the means for providing a variable resistance and having an output connected to a first one of the pair of inputs of the differential amplifier, and further comprising a second buffer amplifier having an input connected to the second terminal of the means for providing a variable resistance and having an output connected to the second one of the pair of inputs of the differential amplifier.

12. Electrical circuitry, comprising:
   a. a resistor having a predetermined value of resistance;
   b. a device having first and second terminals with a value of a resistance across the first and second terminals that is adjustable by a value of a signal applied to a third terminal of the device, the resistance across the first and second terminals of the device being connected in series with the resistance value of the resistor to form a sum total of a value of a controlled resistance;
   c. means for multiplying a voltage across the resistor with a difference between a voltage value of a control signal and a voltage value of a reference signal, and for providing a product signal indicative thereof, the voltage value of the control signal being indicative of a desired value of the controlled resistance; and
   d. means for integrating the product signal and for providing an integrated product signal indicative thereof, the integrated product signal being connected with the third terminal of the device, wherein the value of the resistance across the second and third terminals of the device depends upon a voltage value of the integrated product signal.

13. The electrical circuitry of claim 12, wherein the device comprises a field effect transistor, the first terminal of the device corresponding to a drain terminal of the field effect transistor, the second terminal of the device corresponding to a source terminal of the field effect transistor, a third terminal of the device corresponding to a gate terminal of the field effect transistor.

14. The electrical circuitry of claim 12, further comprising a differential amplifier having a first input connected to a first-terminal of the resistor and a second input connected to the second terminal of the device, the differential amplifier being operable to sense a voltage across the controlled resistance and to provide a differential signal indicative thereof, an input of the means for integrating being connected to the differential signal, the means for integrating comprising means for integrating the product signal and the differential and for providing the integrated product signal indicative thereof.

15. The electrical circuitry of claim 14, further comprising a first buffer amplifier having an input connected to the first terminal of the resistor and having an output connected to the first input of the differential amplifier, and further comprising a second buffer amplifier having an input connected to the second terminal of the device and having an output connected to the second input of the differential amplifier.

16. The electrical circuitry of claim 12, further comprising a differential amplifier having a first input connected to the first terminal of the device and having a second input connected to the second terminal of the device, the differential amplifier being operable to sense a voltage across the device and to provide a differential signal indicative thereof, an input of the means for integrating being connected to the differential signal, the means for integrating comprising means for integrating the product signal and the differential signal and for providing the integrated product signal indicative thereof, and further comprising a first buffer amplifier having an input connected to the first terminal of the device and having an output connected to the first input of the differential amplifier, and further comprising a second buffer amplifier having an input connected to the second terminal of the device and having an output connected to the second input of the differential amplifier.

17. Apparatus, comprising:
   a. a resistor having a predetermined fixed value;
   b. a transistor having first and second terminals that are output terminals of the transistor and having a third terminal that is an input terminal of the transistor, a resistance across the output terminals being variable and having a value depending upon a characteristic of an integrated product signal applied to the input terminal;

c. a multiplier having as input a first signal indicative of the desired value of the variable resistance across the transistor output terminals and a second signal indicative of a reference value, the multiplier being operable to take any difference between the first and second signals and multiply the difference by an electrical characteristic of the resistor and to provide a product signal indicative thereof; and d. an integrator operable to integrate the product signal and to provide the integrated product signal indicative thereof, the input terminal of the transistor being connected with the integrated product signal.

* * * * *